US008664625B2

(12) United States Patent
Jackson

(10) Patent No.: US 8,664,625 B2
(45) Date of Patent: Mar. 4, 2014

(54) INVISIBLE THREE-DIMENSIONAL IMAGE AND METHODS FOR MAKING, USING AND VISIBILITY OF SAME

(75) Inventor: Philip J. Jackson, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 927 days.

(21) Appl. No.: 12/460,408

(22) Filed: Jul. 16, 2009

(65) Prior Publication Data

US 2011/0012503 A1 Jan. 20, 2011

(51) Int. Cl.
*F21V 9/16* (2006.01)
*G01T 1/10* (2006.01)

(52) U.S. Cl.
USPC .................................... 250/462.1; 250/484.2

(58) Field of Classification Search
USPC ...................................................... 250/464.2
See application file for complete search history.

(56) References Cited

U.S. PATENT DOCUMENTS 4,777,108 A 10/1988 Adair
5,811,174 A * 9/1998 Murakami ................ 428/195.1
5,988,821 A * 11/1999 Tanaka et al. ................ 359/536
5,998,789 A * 12/1999 Kovalsky et al. ............ 250/302
7,184,569 B2 2/2007 Lawandy
2004/0227694 A1* 11/2004 Sun et al. .......................... 345/6
2006/0123678 A1* 6/2006 Arvin ............................. 40/547

OTHER PUBLICATIONS

Mallary, Robert. "Luminous Mobiles." accessed Aug. 7, 2012 <http://dada.compart-bremen.de/node/4345>.*
"Fluorescent ACRYLITE acrylic sheet". PLEXIGLAS. accessed May 20, 2013. <http://www.plexiglas-magic.com/AC_EN/Materialien/Fluorescent_ACRYLITE_acrylic_sheet.php5?highmain=10&highsub=0&highsubsub=0>.*

* cited by examiner

*Primary Examiner* — Casey Bryant
(74) *Attorney, Agent, or Firm* — Farjami & Farjami LLP

(57) ABSTRACT

There is provided a system and method for providing and utilizing objects having invisible three-dimensional images. There is provided an object comprising an inner material and an outer material. The inner material is formed in a three-dimensional shape and includes a first portion having a first ratio based on a first fluorescent dye and a first transparent material, wherein the first ratio is selected such as to cause the first portion to remain transparent when exposed to a visible light and the first portion to emit a first visible color when exposed to an invisible light. The outer material comprises a second transparent material formed around the inner material such as to hide the three-dimensional shape of the inner material. By exposing the object to the invisible light, the three-dimensional shape of the inner material is revealed.

24 Claims, 4 Drawing Sheets

INVISIBLE THREE-DIMENSIONAL IMAGE AND METHODS FOR MAKING, USING AND VISIBILITY OF SAME

BACKGROUND OF THE INVENTION

1. Field of the Invention

The present invention relates generally to invisible images. More particularly, the present invention relates to invisible three-dimensional images, and making, using and visibility of same.

2. Background Art

Hidden messages or images embedded within objects can be used to support various communication functions and entertainment applications. For example, objects with hidden messages might be used to support interactive games, personalized messages, media and character novelties, and other applications. In this manner, users can enjoy the thrill, excitement, and fun of discovering hidden messages and images embedded within everyday objects.

Various methods of embedding and revealing such hidden messages and images are already in common use, such as holograms and image transfers viewable only under ultraviolet, infrared, or other non-visible or invisible lights. However, these methods are generally only applicable to two-dimensional objects, such as paper, cards, and other flat surfaces. While laser etching or carving may be used to embed a three-dimensional image within an object, the etched pattern is plainly viewable under standard lighting conditions and is therefore unsuitable for embedding hidden images. Moreover, such etching often requires expensive specialized equipment and materials. Additionally, despite the costs and effort required for three-dimensional etching, the final user impact is often subtle and requires users to closely inspect the object for appreciation.

Accordingly, there is a need to overcome the drawbacks and deficiencies in the art by providing a way to create and present hidden three-dimensional images within objects in a manner that creates a strong user impact while using modest equipment processes and keeping material costs low.

SUMMARY OF THE INVENTION

There are provided invisible three-dimensional images and methods for making, using and visibility of same, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for providing and utilizing objects having invisible three-dimensional images. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
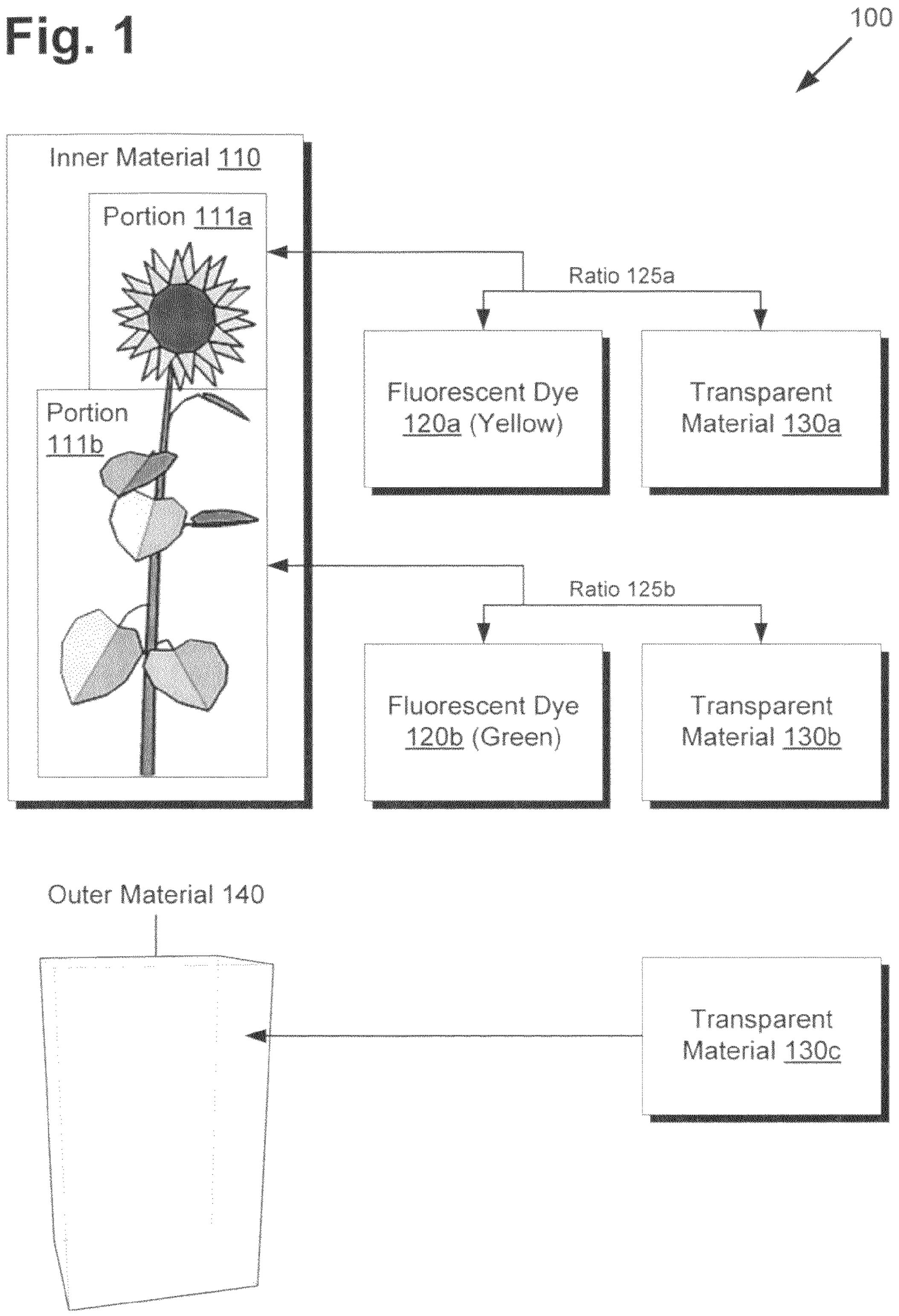
FIG. 1 presents a diagram showing a composition of materials for an object having an invisible three-dimensional image, according to one embodiment of the present invention.

FIG. 1 presents a diagram showing a composition of materials for an object having an invisible three-dimensional image, according to one embodiment of the present invention. Diagram 100 of FIG. 1 includes inner material 110 and outer material 140 as parts of the object. Inner material 110 is formed in the shape of the invisible three-dimensional image and includes portion 111*a*, which is comprised of fluorescent dye 120*a* (yellow) and transparent material 130*a* in ratio 125*a*, and portion 111*b*, which is comprised of fluorescent dye 120*b* (green) and transparent material 130*b* in ratio 125*b*. Outer material 140 is comprised of transparent material 130*c*.

As shown in FIG. 1, inner material 110 depicts a three-dimensional model of a sunflower, with the flower portion, or portion 111*a*, colored yellow and the stem portion, or portion 111*b*, colored green. However, inner material 110 could be modeled to form any desired shape, from simple geometric shapes and written messages to complex three-dimensional character models or architecture. For example, inner material 110 could be formed into a face or body of an animated character, a face or body of a real world actor or personality, a three-dimensional logo or symbol, a famous building or locale such as a castle or tower, or any other object. Ratio 125*a*, defining the amount of fluorescent dye 120*a* to transparent material 130*a*, is selected such as to cause portion 111*a* to remain transparent when exposed to a visible light and to emit or fluoresce a visible yellow color when exposed to an invisible light. In a similar manner, ratio 125*b*, defining the amount of fluorescent dye 120*b* to transparent material 130*b*, is selected such as to cause portion 111*b* to remain transparent when exposed to the visible light and to emit or fluoresce a visible green color when exposed to the invisible light. Although the example shown in FIG. 1 uses different colors for each portion, other embodiments might use the same color for both portions. The invisible light to be exposed may be selected from any electromagnetic radiation spectrum outside the visible light spectrum, such as the ultraviolet light spectrum. Correspondingly, fluorescent dyes 120*a*-120*b* may also specifically comprise fluorescent ultraviolet dyes. In particular, dyes that react to ultraviolet light wavelengths around the range of 365 nm by fluorescing visible light may be utilized.

An optimal ratio 125*a* may be discovered, for example, by using a manual trial and error process, or by using a video camera system or another method for automatically sampling and determining acceptable ranges for ratio 125*a*. A ratio 125*a* having too much fluorescent dye 120*a* may result in portion 111*a* appearing somewhat opaque and discernable from outer material 140, whereas not enough fluorescent dye 120*a* may result in unsatisfactorily faint and dim yellow emissions under invisible light. To provide an optimal result, both of the above situations need to be avoided by using only a minimum amount of fluorescent dye for a satisfactory result, resulting in portion 111*a* of inner material 110 remaining indistinguishable from outer material 140 under visible light conditions while still emitting a yellow color of a desired or optimal intensity when exposed to an invisible light. Different applications may require different intensities when exposed to invisible light, so optimal results may vary depending on the application. “Visible light conditions” as used here may refer to low-light conditions or standard indoor or outdoor lighting conditions.

A similar process may also be used to discover an optimal ratio 125*b*. However, since different colored dyes may react differently to the invisible light, ratios 125*a* and 125*b* may differ. In particular, it has been observed that a blue fluorescent ultraviolet dye provides a particularly efficient blue tint with very little dye material, for example by using one part blue fluorescent ultraviolet dye per 20,000 parts polyurethane as the transparent material. However, other hues may require ratios with larger proportions of fluorescent dye and/or additional steps or components to obtain an acceptable result, such as for example dissolving the fluorescent dye in acetone, alcohol, or other materials. In particular, non-water based dyes have been used with success such as DFSB-Co Clear blue, DFKY-C7 and C6 Clear red, DFPD-C6 Green, and DFSB-43 Yellow obtainable from Risk Reactor, 21544 Newland St, Huntington Beach, Calif. (714-374-8722). As shown in FIG. 1, outer material 140 depicts a three-dimensional model of a shape to surround inner material 110. For the example presented in FIG. 1, the shape of outer material 140 is simply a rectangular box. Since outer material 140 is created to surround inner material 110, outer material 140 is not strictly a complete box but actually has an inner empty space in the same shape as inner material 110, which is not specifically depicted in FIG. 1 for simplicity. Rather than a simple box, more elaborate shapes might also be used, such as a polyhedron, a sphere, or other geometric forms. However, to facilitate the effect of viewing outer material 140 along with embedded inner material 110 as a single transparent object, outer material 140 may use a shape with simpler geometry to avoid excessive light bending and distortion that may obscure the transparent properties of the object.

In FIG. 1, outer material 140 includes transparent material 130*c*, which may comprise, for example, acrylic, a clear liquid resin such as polyurethane, or another transparent material. This same transparent material may also be used for transparent materials 130*a*-130*b*, or transparent materials 130*a*-130*c* may each comprise different materials. The specific choice of materials may depend on various factors such as cost, availability, ease of integration, and amenability to specific applications. In particular, polyurethane may be suitable for low-cost cast based manufacturing processes using inexpensive materials and scalable to large production runs. Additionally, to form the shapes of inner material 110 and outer material 140, any suitable forming method may be utilized, such as casting, pouring, extrusion, pressing, injection, and pressurizing.

As a result of the material compositions presented in FIG. 1, an observer looking at an object comprised of inner material 110 and outer material 140 would only perceive a transparent box under normal lighting conditions, but an exposure to invisible light reveals the hidden three-dimensional shape of inner material 110. As discussed, this is due to ratios 125*a*-125*b* being calibrated to result in portions 111*a*-111*b* of inner material 110 to remain transparent under normal lighting conditions but to emit colors, or yellow and green respectively in FIG. 1, when exposed to an invisible light. Additionally, when exposed only to visible light, the optical properties such as optical indexes of inner material 110 and outer material 140 are substantially matched such that they are perceived as one continuous transparent object, rather than two distinct objects. Although in the example given in FIG. 1, inner material 110 emits visible light whereas outer material 140 remains transparent when exposed to an invisible light, a switched or inverted configuration with outer material 140 emitting visible light when exposed to an invisible light and inner material 140 remaining transparent could also be used as well. This inverted configuration might be used, for example, to illuminate an outer layer of a sphere representing a planet while keeping the inner layers transparent.

The term “substantially” here is used in reference to an intended audience perception, which may be a casual human observer without the benefit of any extraordinary visual aids. Thus, for example, as long as the optical properties between the two different materials, or inner material 110 and outer material 140 in FIG. 1, are substantially similar to each other as to appear visually continuous to a casual human observer, then they may be considered as having substantially matched optical properties. An error margin within the substantially matched limitation may vary depending on the eye sensitivity of the intended audience, the lighting conditions, the materials and the complexity of the three-dimensional shapes being used. For example, a casual human observer might tolerate an optical property error margin of 0 to 10% between materials of substantially matched optical properties. Similarly, as long as the amount of visible light emitted in response to exposure to an invisible light is such that the casual human observer can readily discern the shape of a three-dimensional object emitting the visible light, then it may be described that the emitting object is substantially more visible with the presence of invisible light as compared to without the invisible light. Moreover, although ratios 125*a*-125*b* are selected such that inner material 110 and outer material 140 are both transparent when exposed to visible light, alternative embodiments may select ratios such that inner material 110 and outer material 140 are transparent with a color tint, partially opaque, or translucent. For example, inner material 110 and outer material 140 may both be mixed with a small amount of visible blue dye such that exposure to visible light reveals a transparent object with a blue tint and exposure to invisible light reveals the shape of inner material 110. These semi-transparent or tinted formulations may be particularly applicable for certain situations. For example, if inner material 110 forms the shape of a fish or an airplane, then the blue tint could represent the hue of water or the sky, respectively. Similarly, a white or frosted translucent look might simulate snow or ice, whereas a green tint might hint at grass or foliage. As long as the optical properties between the inner and outer materials are substantially the same, then the visual effect of observing a single continuous object is preserved, even if the materials are tinted or semi transparent instead of fully transparent.

Figure 2A:
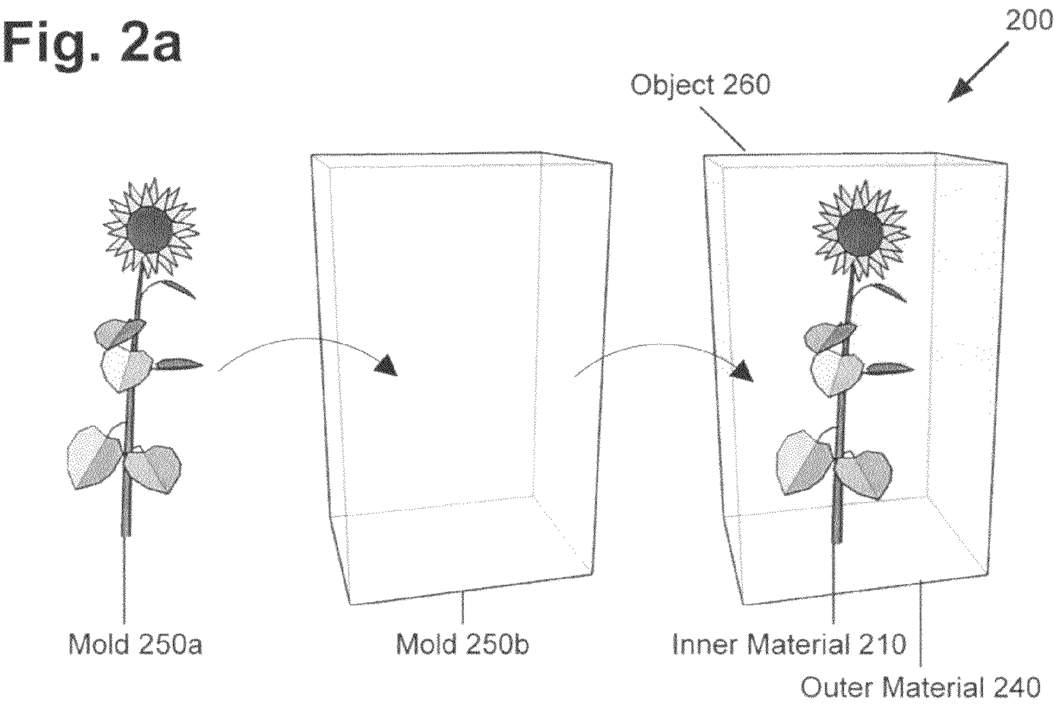
FIG. 2*a* presents a diagram showing a process to manufacture an object having an invisible three-dimensional image, according to one embodiment of the present invention.

Moving to FIG. 2*a*, FIG. 2*a* presents a diagram showing a process to manufacture an object having an invisible three-dimensional image, according to one embodiment of the present invention. Diagram 200 of FIG. 2*a* includes mold 250*a,* mold 250*b*, and object 260. Object 260 includes inner material 210 and outer material 240. With respect to FIG. 2*a*, it should be noted that inner material 210 corresponds to inner material 110 from FIG. 1, and that outer material 240 corresponds to outer material 140.

In an example manufacturing process, mold 250*a* corresponding to inner material 210 and mold 250*b* corresponding to outer material 240 may first be created using any suitable three-dimensional mold creation technique. Inner material 210 can be created by casting mold 250*a* with the materials specified by ratios 125*a*-125*b* in FIG. 1. If mold 250*a* is to be defined by a single hue of color, then a single unified mold may suffice. However, since mold 250*a* is defined by portions 111*a*-111*b* from FIG. 1 having different color hues, or the yellow flower and green stem portions, mold 250*a* may be further partitioned into separate sections, or split into separate molds. However, mold 250*a* is shown as a single unified mold in FIG. 1 for simplicity.

Once mold 250*a* is created and ready for use, the materials described by ratios 125*a*-125*b* can be used to cast mold 250*a* into inner material 210. For example, a standard resin casting technique can be used where mold 250*a* is filled with a clear liquid resin mixture that solidifies with a curing agent. In this case, transparent materials 130*a*-130*b* may comprise polyurethane, and fluorescent dyes 120*a*-120*b* may comprise liquid dyes that react to ultraviolet light, as previously described. Alternative methods amenable for mass production such as injection molding may also be utilized. Once inner material 210 in the shape of mold 250*a* is cast or solidified from a liquid state to a solid state, the manufacturing process can move to mold 250*b*.

Inner material 210 may then be suspended within mold 250*b*, and transparent material 130*c* from FIG. 1 may then be pressurized and solidified around inner material 210 to create outer material 240. As previously discussed, transparent material 130*c* may be the same material as transparent material 130*a* or transparent material 130*b*, or may comprise a different material. Furthermore, additional components such as a curing agent may be added to transparent material 130*c*. Once outer material 240 is fully cast, then an the result may appear as object 260 of FIG. 1, where inner material 210 is enclosed by outer material 240. It should be noted that the process described with FIG. 2*a* is only one example method, and any number of suitable forming methods may be utilized as previously discussed, such as casting, pouring, extrusion, pressing, injection, and pressurizing.

Figure 2B:
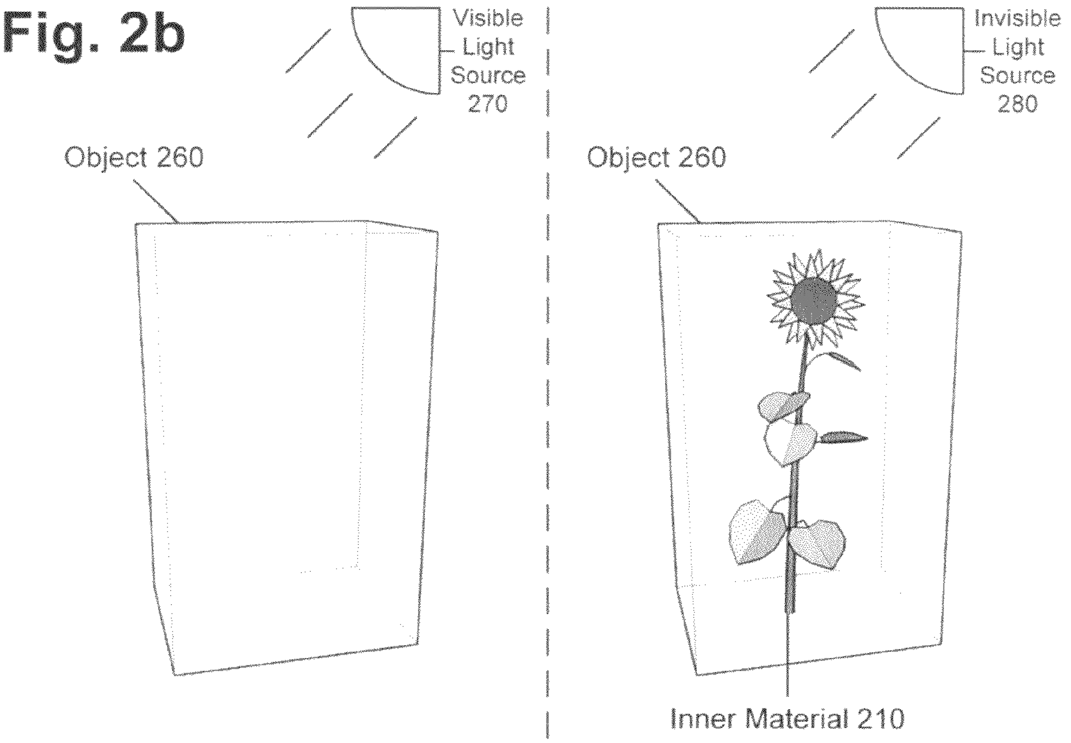
FIG. 2*b* presents a diagram showing an object having an invisible three-dimensional image being exposed to visible and invisible light, according to one embodiment of the present invention.

Moving to FIG. 2*b*, FIG. 2*b* presents a diagram showing an object having an invisible three-dimensional image being exposed to visible and invisible light, according to one embodiment of the present invention. Diagram 200 of FIG. 2*b* includes object 260, visible light source 270, and invisible light source 280. Object 260 includes inner material 210.

As previously discussed, ratios 125*a*-125*b* are created such that inner material 210 corresponding to inner material 110 from FIG. 1 remains transparent when exposed to visible light. Since outer material 240 is also transparent when exposed to visible light, object 260 appears to hide the shape of inner material 210 when exposed to visible light source 270, as shown in FIG. 2*b*. That is, since both inner material 210 and outer material 240 of object 260 in FIG. 2*a* are transparent under visible light source 270, only the outermost three-dimensional shape of outer material 240 is perceptible when object 260 is viewed under visible light source 270. Visible light source 270 may provide, for example, artificial or natural light primarily from the visible spectrum to support low-light or standard indoor or outdoor lighting conditions.

However, once invisible light source 280 is introduced, then inner material 210 of object 260 emits the colors of the component fluorescent dyes, as shown to the right in FIG. 2*b*. Thus, a user observing object 260 will see inner material 210 appearing to glow yellow for the flower component and green for the stem component. As previously discussed, inner material 210 may more specifically be formed using fluorescent ultraviolet dyes that fluoresce when exposed to invisible light source 280, which may specifically comprise an ultraviolet light source.

If object 260 is manufactured similar to the manner discussed above, then the visibility of the hidden three-dimensional shape formed by inner material 210 can be toggled or dimmed at will by manipulating the intensity of invisible light source 280. Although invisible light source 280 is shown as external to object 260 in FIG. 2*b,* invisible light source 280 may also be embedded within object 260 as part of the manufacturing process. For example, an ultraviolet LED and a battery or solar power source may be embedded within outer material 240, or additional material may be added to object 260 to contain invisible light source 280 and any electrical components. If invisible light source 280 is embedded within object 260, then an automatic or manual switch or dimmer control might also be embedded to allow invisible light source 280 to be switched on and off or dimmed in-between. Alternatively or additionally, a wireless receiver or another means of remotely triggering invisible light source 280 may be embedded to enable remote control or automation.

As shown in FIGS. 2*a*-2*b*, the finished object 260 may be used to present a solid block of material with a hidden embedded three-dimensional object, suitable for character goods, architectural models, personalized novelties, and other applications. While the finished object 260 may have a high hardness measurement such as Shore 90 rating, object 260 may also alternatively form a more flexible product with a lower Shore rating by using flexible transparent materials such as urethane, silicone, and other materials. This may have particular application for flexible consumer products such as clothing, footwear, fashion accessories, toys, novelties, and other objects having embedded three-dimensional images viewable with an internally or externally triggered invisible light. Flexible materials might also be used to construct luminescent simulated marine life, animal or plant models, and articulating robots for amusement or informational applications.

For example, flexible partially or wholly transparent rubber footwear might be developed using an internal invisible light source that glows or strobes in reaction to a connected motion sensor. When the wearer of the footwear jumps or steps or otherwise triggers the motion sensor, the internal invisible light source might flash or strobe to reveal a three-dimensional object embedded within transparent soles of the footwear. Alternatively, the light source might be external to the object. For example, a room might be equipped with a motion-sensing floor that directs invisible light to areas of motion activity, revealing three-dimensional shapes in footwear worn by people traveling across the room. This technique could also be used for other clothing and fashion items and accessories, such as caps, hats, bags, earrings, jackets, sweaters, and others.

Another example might include a flexible simulated deep-sea creature with a body portion that glows or flashes underwater. By using flexible materials, the simulated deep-sea creature can move in a convincing manner, swimming and moving similarly to real marine life. The deep-sea creature might include an embedded power source and an internal light source, or an external light source might be provided within a water tank enclosing the deep-sea creature. Although light sources may need to be adjusted since light is traveling through water rather than air, the invisible three-dimensional image described in this application is still applicable for underwater situations.

Figure 3:
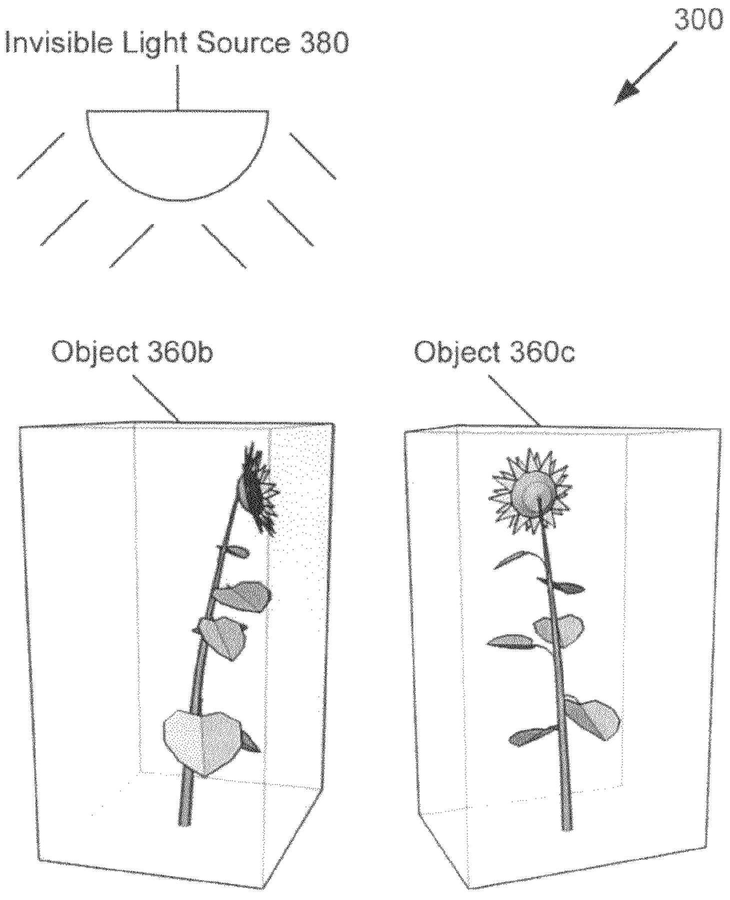
FIG. 3 presents a diagram showing objects having invisible three-dimensional images being rotated to show different viewpoints.

Moving to FIG. 3, it presents a diagram showing objects having invisible three-dimensional images being rotated to show different viewpoints. Diagram 300 of FIG. 3 includes objects 360*a*-360*c* and invisible light source 380. With regards to FIG. 3, it should be noted that objects 360*a*-360*c* correspond to object 260 from FIGS. 2*a*-2*b*, and that invisible light source 380 corresponds to invisible light source 280 from FIG. 2*b*.

As shown in FIG. 3, objects 360*a*-360*c* represent the same object rotated at different angles to emphasize the three-dimensionality of the embedded inner shape. If invisible light source 380 is omitted, then objects 360*a*-360*c* may each appear as a transparent box with no perceivable inner shape. However, with exposure to invisible light source 380, object 360*a* shows the inner shape from a frontal viewpoint, object 360*b* shows the inner shape from a side viewpoint, and object 360*c* shows the inner shape from a rear viewpoint. Thus, it is apparent that a true three-dimensional shape can be embedded in an object, rather than only a simple two-dimensional message or drawing on a flat surface.

Figure 4:
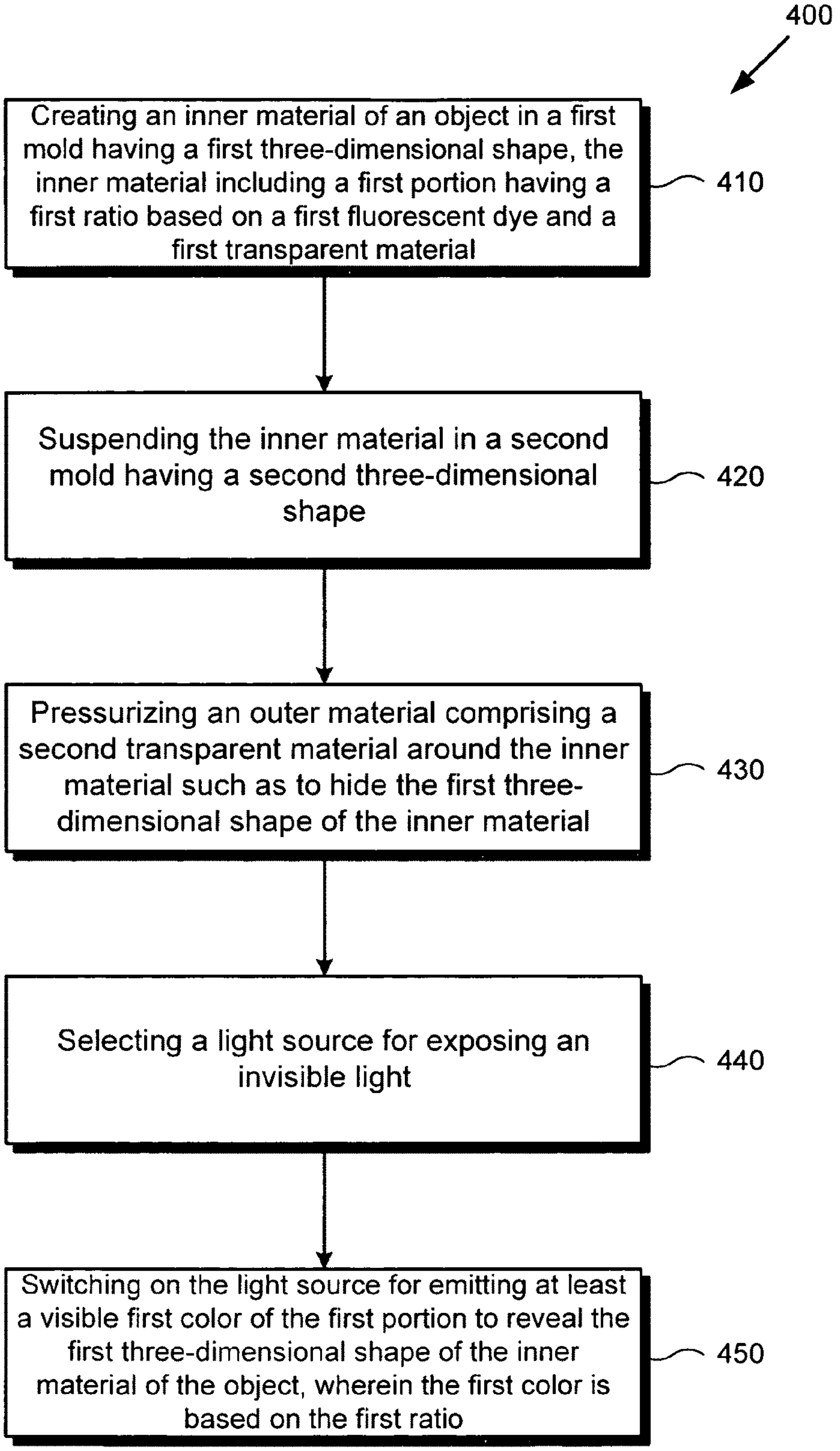
FIG. 4 shows a flowchart describing the steps, according to one embodiment of the present invention, by which an object having an invisible three-dimensional image may be manufactured and by which the invisible three-dimensional image may be revealed.

Moving to FIG. 4, FIG. 4 shows a flowchart describing the steps, according to one embodiment of the present invention, by which an object having an invisible three-dimensional image may be manufactured and by which the invisible three-dimensional image may be revealed. Certain details and features have been left out of flowchart 400 that are apparent to a person of ordinary skill in the art. For example, a step may comprise one or more substeps or may involve specialized equipment or materials, as known in the art. While steps 410 through 450 indicated in flowchart 400 are sufficient to describe one embodiment of the present invention, other embodiments of the invention may utilize steps different from those shown in flowchart 400.

Referring to step 410 of flowchart 400 in FIG. 5, diagram 100 of FIG. 1, and diagram 200 of FIG. 2*a*, step 410 of flowchart 400 comprises creating inner material 210 of object 260 in mold 250*a* having the shape of a sunflower, inner material 210 including portion 111*a* having ratio 125*a* based on fluorescent dye 120*a* and transparent material 130*a*. As shown by FIGS. 1 and 2*a*, inner material 210 may also include additional portions with different ratios, such as portion 111*b*. As previously discussed, the creation of inner material 210 from mold 250*a* may use standard casting or injection molding techniques.

Referring to step 420 of flowchart 400 in FIG. 5 and diagram 200 of FIG. 2*a*, step 420 of flowchart 400 comprises suspending inner material 210 created from step 410 in mold 250*b* having the shape of a rectangular box. As previously discussed, mold 250*b* may also form a variety of other three-dimensional shapes, but a simpler shape having less interactions with passing light may be more suitable for emphasizing the transparent properties of the final object 260.

Referring to step 430 of flowchart 400 in FIG. 5, diagram 100 of FIG. 1, and diagram 200 of FIG. 2*a*, step 430 of flowchart 400 comprises pressurizing outer material 240 comprising transparent material 130*c* around inner material 210 suspended in mold 250*b* from step 420 such as to hide the shape of inner material 210. Step 430 may use similar processes as step 420 for casting outer material 240. As previously discussed, referring to FIG. 2*b*, the shape of inner material 210 is hidden since both inner material 210 and outer material 240 of object 260 appear as transparent when exposed to visible light source 270. Only when object 260 is exposed to invisible light source 280 does the shape of inner material 210 make itself manifest.

Referring to step 440 of flowchart 400 in FIG. 5 and diagram 200 of FIG. 2*b*, step 440 of flowchart 400 comprises selecting invisible light source 280 for exposing an invisible light. This selection is dependent on the particular types of fluorescent dyes used for the composition of object 260. For example, if fluorescent ultraviolet dyes were used, then an ultraviolet LED or bulb may be selected for invisible light source 280 to expose an ultraviolet light. As previously discussed, invisible light source 280 may comprise an external or internal light source in relation to object 260.

Referring to step 450 of flowchart 400 in FIG. 5, diagram 100 of FIG. 1, and diagram 200 of FIG. 2*b*, step 450 of flowchart 400 comprises switching on invisible light source 280 selected from step 440 for emitting at least a visible yellow color of portion 111*a* to reveal the shape of inner material 210, wherein the yellow color is based on ratio 125*a* used in step 410. As previously discussed, inner material 210 may also comprise additional portions such as portion 111*b*, which may for example emit a green color based on ratio 125*b*. Invisible light source 280 may be switched on or dimmed by local or remote control, manually or automatically. After step 450, the dyes contained in inner material 210 will react to invisible light source 280, providing a visible indication of the three-dimensional shape of inner material 210, as shown to the right of FIG. 2*b*. The steps described in FIG. 4 provide one example manufacturing and presentation process; alternative manufacturing and presentation methods may also be used as described in this application.

This invisible three-dimensional image may be used to support a variety of consumer and other applications, as previously described. Additional examples might include, for example, multiple invisible three-dimensional models configured as a three-dimensional zoetrope animation, a security wall turning opaque or revealing invisible messages with written warnings or informational messages, or integration with a video camera for automated ultraviolet monitoring or other spectral monitoring or warning systems.

In more detail, a zoetrope animation is typically constructed using actual physical objects that are evenly spaced and modeled such that each successive adjacent object or scene of objects represents a new frame of animation. By physically moving the zoetrope, which might typically be constructed as a circular rotating platform or a linear platform, and using stroboscopic lighting or another means to hide the transitions between frames, viewers experience an end result similar to viewing an animation.

However, by instead embedding invisible three-dimensional images representing the animation frames within a single outer material, a consolidated three-dimensional zoetrope animation can be produced in a single object. By also including, for example, a motor and a stroboscopic invisible light source, the single object can also automatically initiate the zoetrope animation, which appears to the viewer as a three-dimensional animation suspended within the material of the object. Thus, while the object might appear as a transparent block normally, once the zoetrope animation is initiated, a three-dimensional animation suspended in the block suddenly becomes visible, providing a strong visual impact. This application could be scaled to a small handheld version for a portable novelty, or to a large permanent installation to provide an impressive large-scale three-dimensional animation for viewers. Additionally, an audio chip and speaker might be embedded to provide speech, sounds, or music, further enhancing the experience.

For example, a fully three-dimensional "talking head" viewable from all angles might comprise one particular entertainment application. Thus, an impressive effect similar to a talking three-dimensional hologram can be provided in a cost effective manner. Another example might comprise a dancing three-dimensional figure, also viewable from all angles as a three-dimensional model. By simply changing the embedded images within the object, any desired three-dimensional animation can be supported. Furthermore, inner object dye colors might be blended and changed from image to image, allowing the zoetrope animation to smoothly transition to and from different colors and intensities.

Besides entertainment applications, the three-dimensional invisible image can also be used for informational and security applications. For example, a clear window might normally remain transparent, but in an emergency situation, invisible lights within the clear window might reveal a three-dimensional warning sign or other important emergency information. By spacing apart several different messages and using directed invisible lights, multiple messages may also be selectively revealed depending on the circumstances. For example, a green "all clear" sign, a yellow "warning" sign, and a red "danger" sign might all be embedded within the same window of a room, with angled invisible lights selectively revealing a particular sign depending on the status of the room. Another example may have a security wall as normally transparent, but turning to opaque when embedded invisible lights are switched on. This could have application for aircraft, hospitals, and other areas needing flexible monitoring, security, and privacy systems.

Since the invisible three-dimensional image within an object can be created to react to a particular spectrum, such as ultraviolet light, it may also support a warning system indicating the amount of radiation from a particular spectrum. For example, a pair of sunglasses or a car windshield might reveal an embedded image providing an outdoor UV rating and warning of potential sunburn if enough ultraviolet light from the sun is present. This warning system might also be used for automated applications, for example by using a video camera connected to a computer system. The computer system could periodically scan an object that reacts to a desired spectrum, such as ultraviolet light, and react according to the intensity of the emitted light. For example, an automated greenhouse might moderate the amount of incoming sunlight by opening or closing windows depending on a scanned intensity of light from a camera focused on an object having an ultraviolet dye. This way, the crops within the greenhouse can automatically receive optimal amounts of sunlight for growth.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. An object comprising:

an inner material formed in a three-dimensional shape and including a first portion having a first ratio based on a first fluorescent dye and a first transparent material;

wherein the first ratio is selected such as to cause the first portion to be invisible when exposed to a visible light and the first portion to emit a first visible color when exposed to an invisible light;

an outer material comprising a second transparent material formed around the inner material and completely surrounding the inner material, wherein the three-dimensional shape of the inner material is invisible inside the outer material when the object is exposed to the visible light and the inner material emits the first visible color when exposed to the invisible light.

2. The object of claim 1, wherein the first fluorescent dye is a fluorescent ultraviolet dye, and wherein the invisible light comprises an ultraviolet light.

3. The object of claim 1, wherein the inner material further includes a second portion having a second ratio based on a second fluorescent dye and the first transparent material, wherein the second ratio is selected such as to cause the second portion to be invisible when exposed to the visible light and the second portion to emit a second visible color when exposed the invisible light.

4. The object of claim 3, wherein the first visible color and the second visible color are different.

5. The object of claim 1, wherein tile first transparent material and the second transparent material are the same.

6. The object of claim 1, wherein the first transparent material comprises acrylic.

7. The object of claim 1, wherein the first transparent material comprises a clear liquid resin.

8. The object of claim 7, wherein the clear liquid resin is polyurethane.

9. The object of claim 1, further comprising an internal light source for exposing the invisible light.

10. The object of claim 9, further comprising a switch for turning the internal light source on or off.

11. An object comprising:

a first three-dimensional material; and a second three-dimensional material embedded in the first three-dimensional material and completely surrounded by the first three-dimensional material;

wherein optical properties of the first three-dimensional material are substantially matched with the second three-dimensional material under a first lighting condition and wherein the optical properties of the first three-dimensional material are substantially different from the optical properties of the second three-dimensional material under a second lighting condition such that the second three-dimensional material is substantially more visible under the second lighting condition as compared to the first lighting condition.

12. The object of claim 11, wherein the first lighting condition includes electromagnetic radiation wavelengths primarily in the visible light spectrum.

13. The object of claim 11, wherein the second lighting condition includes electromagnetic radiation wavelengths in the ultraviolet light spectrum.

14. The of claim 11, wherein under the second lighting condition the second three-dimensional material is substantially more visible as compared to the first lighting condition by emitting electromagnetic radiation in the visible light spectrum.

15. The object of claim 11, wherein the second three-dimensional material comprises a fluorescent dye and a transparent material and wherein the first three-dimensional material comprises a transparent material.

16. An object comprising:

an inner material formed in a three-dimensional shape and including a first portion having a first ratio based on a first fluorescent dye and a first transparent material; and an outer material comprising a second transparent material formed around the inner material and completely surrounding the inner material, wherein the three-dimensional shape of the inner material is invisible inside the outer material when the object is exposed to a visible light;

wherein the first ratio is selected such as to cause the first portion to remain invisible when exposed to the visible light and the first portion to emit a first visible color when exposed to an invisible light.

17. The object of claim 16, wherein the first fluorescent dye is a fluorescent ultraviolet dye, and wherein the invisible light comprises an ultraviolet light.

18. The object of claim 16, wherein the inner material further includes a second portion having a second ratio based on a second fluorescent dye and the first transparent material, wherein the second ratio is selected such as to cause the second portion to remain invisible when exposed to the visible light and the second portion to emit a second visible color when exposed the invisible light.

19. The object of claim 18, wherein the first visible color and the second visible color are different.

20. The object of claim 16, wherein the first transparent material and the second transparent material are the same.

21. The object of claim 16, wherein the first transparent material comprises acrylic.

22. The object of claim 16, wherein the first transparent material comprises a clear liquid resin.

23. The object of claim 22, wherein the clear liquid resin is polyurethane.

24. The object of claim 16, further comprising an internal light source for exposing the invisible light.

* * * * *

UNITED STATES PATENT AND TRADEMARK OFFICE

CERTIFICATE OF CORRECTION

PATENT NO. : 8,664,625 B2
APPLICATION NO. : 12/460408
DATED : March 4, 2014
INVENTOR(S) : Philip J. Jackson It is certified that error appears in the above-identified patent and that said Letters Patent is hereby corrected as shown below:

In The Claims

Column 10, Line 48, Claim 11 “condition such” should be --condition, such--.

Column 10, Line 58, Claim 14 “The of claim” should be --The object of claim--.

Signed and Sealed this
Nineteenth Day of May, 2015

Michelle K. Lee
*Director of the United States Patent and Trademark Office*